W. H. TRAMMELL.
AUTOMOBILE ATTACHMENT.
APPLICATION FILED SEPT. 24, 1915.

1,277,781.

Patented Sept. 3, 1918.

Witnesses
H. H. Lybrand
M. Delaney

Inventor
William H. Trammell
By Edgar M. Kitchin,
his Attorney.

UNITED STATES PATENT OFFICE.

WILLIAM H. TRAMMELL, OF BELTON, SOUTH CAROLINA.

AUTOMOBILE ATTACHMENT.

1,277,781.  Specification of Letters Patent.  Patented Sept. 3, 1918.

Application filed September 24, 1915. Serial No. 52,416.

*To all whom it may concern:*

Be it known that I, WILLIAM H. TRAMMELL, a citizen of the United States, residing at Belton, in the county of Anderson and State of South Carolina, have invented certain new and useful Improvements in Automobile Attachments; and I do hereby declare the following to be a full, clear, and exact description of the invention, such as will enable others skilled in the art to which it appertains to make and use the same.

This invention relates to improvements in automobile construction, and more particularly to attachments designed for increasing the comfort of the occupants of the vehicle.

Among the objects in view is the provision for a pleasant and enjoyable rest for a child to enable sleeping during use of the automobile without interfering with the running of the vehicle or its regular employment by its occupants.

A more detailed object is the provision of such rest in the form of a collapsible structure, susceptible of assuming a very compact form so as to occupy a minimum amount of space when not in use.

With these and further objects in view as will in part become apparent and in part be stated, the invention comprises certain novel constructions, combinations and arrangements of parts as will subsequently in part become obvious and in part be specifically pointed out.

In the accompanying drawing:—

Figure 1:
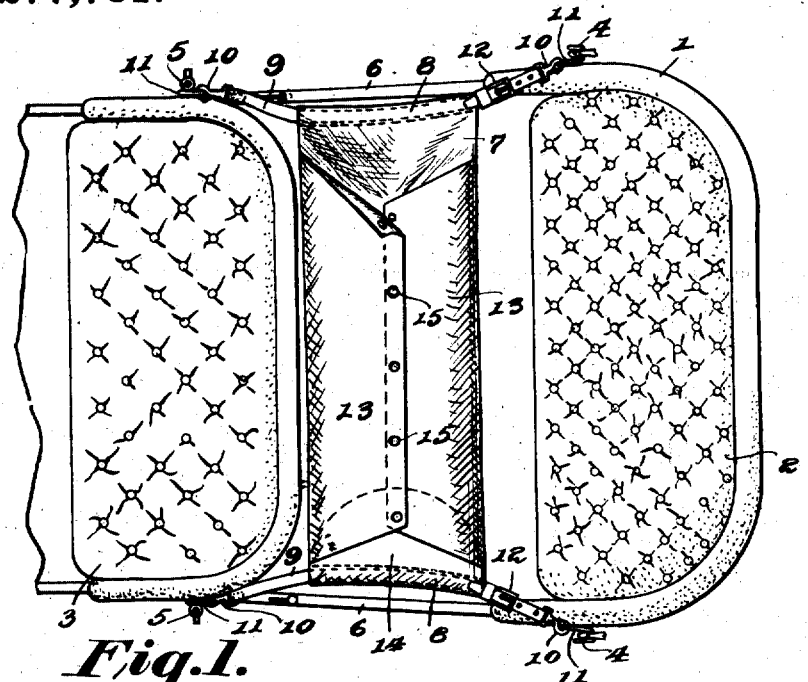
Figure 1 is a top plan view of a portion of an automobile incorporating an embodiment of the invention.
Figure 2:
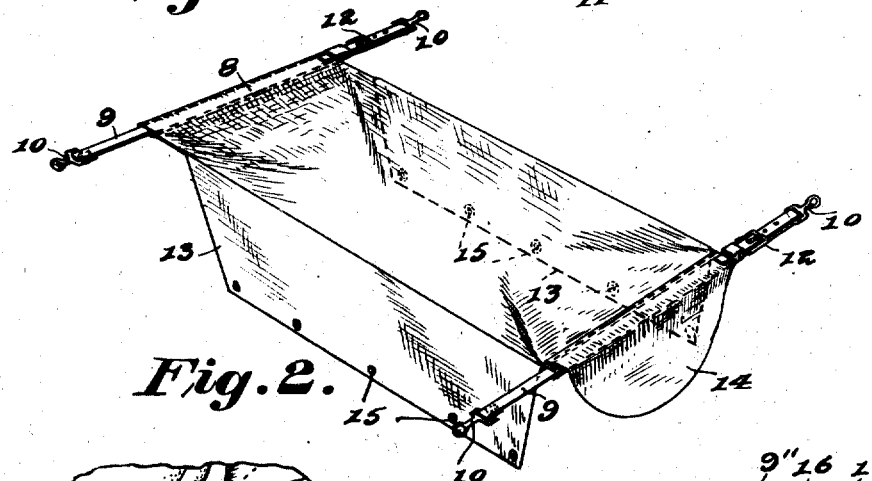
Fig. 2 is a detail perspective view of the attachment detached.

Referring to the drawing by numerals, 1 indicates the tonneau or body of any ordinary automobile. The tonneau is provided with the usual rear seat 2, and in the front of the body is arranged the regular front seat 3. The usual top supports 4, 4 and 5, 5, respectively, extend laterally at the rear and front end portions of the tonneau. The usual side doors 6, 6 enable access to and exit from the tonneau.

Within the tonneau in front of the seat 2 is arranged the rest, which consists of a hammock-like structure formed of a sheet 7 of flexible material, such as leather, canvas, denim, or the like, each end portion of which is provided with an open end hem 8, forming a sleeve, through which is extended the respective supporting strap 9, there being a strap 9 at each end. Each strap 9 is provided with an engaging hook, preferably in the form of a snap 10 at each end designed to detachably engage a ring 11, the rings 11 being disposed to encircle the top supports 4 and 5. Each strap 9 is also provided with an adjustable buckle 12, so that by varying the length of the strap, the extent to which the sheet or body 7 of the rest may sag may be varied, and the operative length of the hammock may be varied to suit the different widths of tonneaus. The body or sheet 7 of the rest may consist of a plain, straight strip of fabric, without side or end flaps, but usually it will be preferable to provide side flaps 13, 13, and an end flap 14, adapted to be infolded in use as indicated in Fig. 1, so as to form both a cover for the occupant of the hammock or rest and a sustaining means to keep the child from being rolled or tossed out incident to jolting of the vehicle. To render the flaps more effective to this end, they are preferably buttoned together as by buttons 15, preferably of the glove snap button type.

Figure 3:
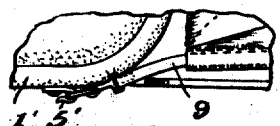
Fig. 3 is a fragmentary plan view of a slightly modified form of connection of the attachment.

In Fig. 3 is seen the automobile body 1' of the type provided with the so-called "one man top" in which structure, as is well known, there is no top support at the front seat. As seen in Fig. 3, when such structure is employed, it is only necessary to provide a hook 5', fixed to the body of the vehicle to receive the hook of the rest, the structure of the rest itself being identical with that above described.

Figure 4:
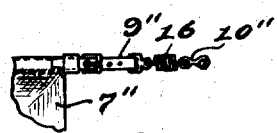
Fig. 4 is a similar view of a further embodiment.

As suggested above, the rest or hammock may be formed without flaps, as indicated at 7" in Fig. 4. In the structure seen in this figure, the usual straps 9" are employed corresponding in form and function with the straps 9, and the usual snaps 10" are also employed, but between the snaps and straps are arranged springs 16 tensioned to sufficiently respond to the vibrations of the vehicle body to largely relieve the occupant of the hammock or rest of the jarring incident to such vibrations. It is, of course, an arbitrary matter with the user whether the springs 16 are employed or not, and will be preferably employed usually for a very young child or infant, and, of course, it is obvious that the spring 16 may be employed with the type of rest having the side and end flaps.

In use, the hammock or rest 7 is supported above the plane and usually in front of the knees of the occupants of the seat 2, so that there is the utmost freedom for movement of the feet of such occupants, and the rest, therefore, offers no interference whatever with the comfort and regular employment of the vehicle for traveling purposes, and leaves the front portion of the floor of the tonneau free for carrying baggage.

Ordinarily, when the rest 7 is not to be used, it is rolled up or folded into a very compact form and either placed under the seat 2 or behind the cushion thereof, or elsewhere out of the way, not requiring tonneau occupants to rise to obtain the hammock or rest. Assuming that a party with children is touring or that a child is being taken on a ride and becomes tired and sleepy, the rest is simply gotten out from its storage place and the snaps 10 are snapped over the rings 11, whereupon the rest is ready for the occupancy of the child. For the child's comfort, a pillow might be taken along and placed at the head end of the rest, but that, of course, is a matter for the discretion of the user. After the child has had a nap or otherwise completed his rest and desires to arise, the flaps 13 will be thrown back, the child removed, the snaps 10 unhooked from the rings 11, and the rest refolded and replaced at its storage point.

It is observed that the hammock or rest is especially well adapted, when not being used by a child, for carrying bundles, or packages of any kind, including the hats of the tonneau occupants.

What I claim is:—

In a hammock structure adapted for suspension in a vehicle tonneau, the combination of an elongated body portion of a length equal substantially to the width of the tonneau, and having a hem at each end, a foot flap at one end and side flaps at the opposite longitudinal edges of the body portion, supports threaded through said hems and adapted to be secured at opposite ends to the sides of the tonneau, and to be drawn taut longitudinally of the hems to stretch the body portion into a substantially flat horizontal position, and means for securing the flaps together in over-turned position upon the body portion to retain the occupant from rolling from the flat horizontal body portion.

In testimony whereof I affix my signature in presence of two witnesses.

WILLIAM H. TRAMMELL.

Witnesses:
HENRY R. CAMPBELL,
WALTER E. GREER.